US005951809A

United States Patent [19]

Jenkins et al.

[11] Patent Number: 5,951,809

[45] Date of Patent: Sep. 14, 1999

[54] METHOD OF PROVIDING IDENTIFYING INDICIA TO A ROOFING SHINGLE

[75] Inventors: Robert L. Jenkins, Coatesville; George F. Wilkins, Norristown; Michael J. Noone, Wayne; Norman M. Robinson, Coatesville; Robert E. Oglesby, Downingtown, all of Pa.

[73] Assignee: CertainTeed Corporation, Valley Forge, Pa.

[21] Appl. No.: 08/033,176

[22] Filed: Mar. 16, 1993

Related U.S. Application Data

[62] Division of application No. 07/859,240, Mar. 26, 1992, abandoned, which is a continuation of application No. 07/601,987, Oct. 23, 1990, abandoned.

[51] Int. Cl.$^{6}$ .................................................... B32B 31/00

[52] U.S. Cl. .......................... 156/277; 156/247; 156/289

[58] Field of Search ................................ 52/105; 156/71, 156/277, 289, 247

[56] References Cited

U.S. PATENT DOCUMENTS

| | | | |
|---|---|---|---|
| 1,284,997 | 11/1918 | Bigler . | |
| 1,480,023 | 12/1924 | Speer . | |
| 3,138,897 | 6/1964 | McCorkle | 50/243 |
| 3,624,975 | 12/1971 | Morgan et al. | 52/105 |
| 3,835,604 | 9/1974 | Hoffmann, Jr. | 52/105 |
| 4,055,453 | 10/1977 | Tajima et al. | 156/279 |
| 4,670,071 | 6/1987 | Cooper et al. | 156/71 |
| 4,751,122 | 6/1988 | May | 428/41 |
| 4,907,636 | 3/1990 | Simon | 428/40 |

*Primary Examiner*—James Engel
*Attorney, Agent, or Firm*—Paul & Paul

[57] ABSTRACT

A composition roofing shingle is described which has release material affixed thereto for the purpose of identifying the compositional shingle with process parameters for the time frame of manufacture. The identification is achieved by marking the release material with planographic idicia by means such as printing, stamping and ink-jet spray application.

11 Claims, 1 Drawing Sheet

METHOD OF PROVIDING IDENTIFYING INDICIA TO A ROOFING SHINGLE

This is a divisional of copending application Ser. No. 07/859,240 filed Mar. 26, 1992 now abandoned, which is a continuation of application Ser. No. 07/601,987 filed Oct. 23, 1990 now abandoned.

This invention relates to improved composition roofing material. More particularly it relates to roofing material of the self-sealing shingle type incorporating "release material" which is modified so as to incorporate permanent identifying indicia thereon.

BACKGROUND OF THE INVENTION

In the manufacture of composition roofing material, such as asphalt shingles and the like, indicia for identifying the materials at the time of manufacture have been applied to one side of the materials in a clear and distinct manner without any resulting disruption or marring of the face surface of the materials. In one such development, U.S. Pat. No. 1,480,023, a raised die was made to cut one side of the warm and plastic composition so as to impart the desired indicia without marring the face surface of the material.

The use of "release material" in the manufacture of self-sealing asphalt shingles to prevent sticking of the self-sealing medium to shingles while packaged is known. For example, see U.S. Pat. No. 3,138,897.

An object of this invention is to provide an asphalt type shingle of the self-sealing type or non-self-sealing type which has a novel type of "release material" superimposed thereon to form a portion of the shingle.

Another object of this invention is to provide for composition roofing, such as asphalt or the like, a method of individual identification which does not result in any marring of the shingle surface, either the weathering side or the opposite back side, but which nevertheless, provides clear and distinct legibility and cannot be readily obliterated.

SUMMARY OF THE INVENTION

In accordance with the invention there is provided a composition roofing shingle comprising an elongated shingle body and an exposed face, said face having affixed thereto "release material" bearing planographic indicia which identifies the compositional shingle with process parameters for the time frame of manufacture.

DESCRIPTION OF THE PREFERRED EMBODIMENT

Figure 1:
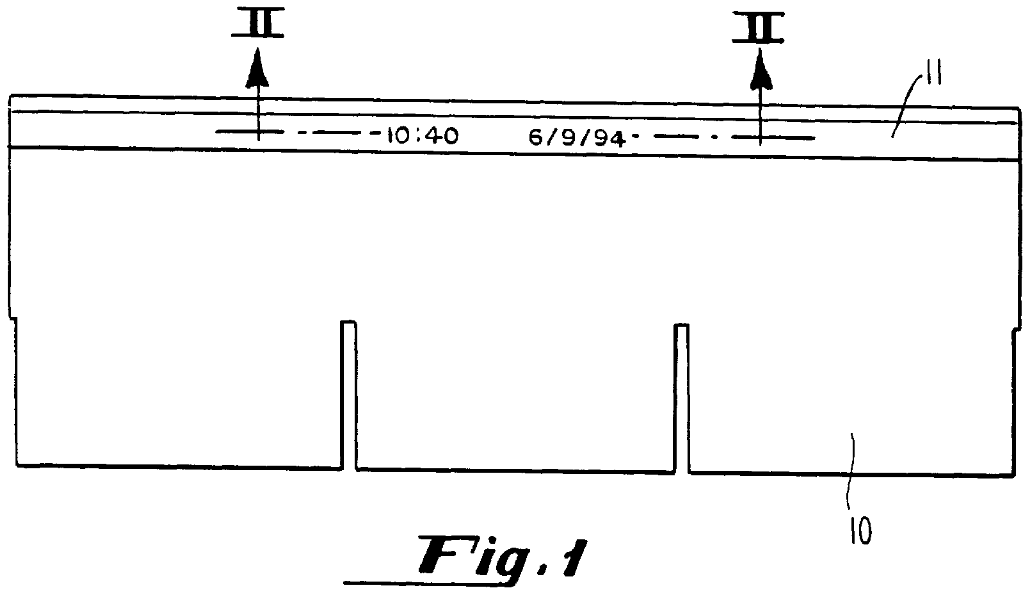
FIG. 1 is a plan view showing a face of an individual shingle having affixed thereto "release material" bearing planographic indicia.
Figure 3:
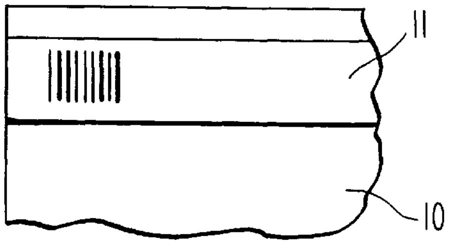
FIG. 3 is a plan view of a further embodiment of the shingle of this invention, parts being broken away.
Figure 2:
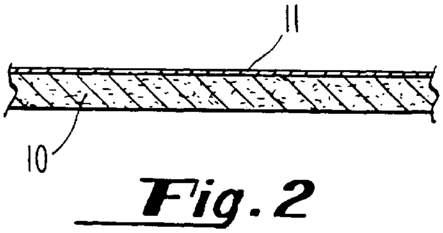
FIG. 2 is a sectional view taken along the lines and in the direction of the arrows II—II of FIG. 1.

Referring to FIGS. 1 and 2, the composition roofing shingle of this invention comprises a shingle body 10 having "release material" 11 affixed thereto which bears planographic indicia indicating the time and date of manufacture. As seen in FIG. 3, in an alternative embodiment of this invention, the planographic indicia may be provided in the form of a bar code upon the "release material".

In order to obtain clear and concise identification of an individual compositional shingle the "release material" must be marked, printed, time stamped or coded in such a manner as to be legible and readable. The "release material" may be composed of materials such as parchment, polyester, foil, paper, natural waterleaf, polyethylene and any material considered appropriate for use as "release material" in the roofing industry. Among the methods suitable for marking, printing or coding a "release material" are included direct printing, time stamp, bar code, reverse printing, ink jet spray, ultra-violet and radiation code (isotope). The aforesaid marking, print or code may be applied to either side of the "release material" or may be applied directly to the release agent that covers the surface of the "release material" using an ink or similar material. It is beneficial for legibility purposes, to use heat resistant ink or similar material on that side of the material contacting the backside asphalt during production of a compositional shingle. The ink or similar material should also remain legible when in contact with the asphaltic and non-asphaltic sealant type materials used in the production of a compositional shingle. The ink or similar material should also remain legible under all production parameters, including both packaging and storage conditions, as well as, but not limited to, the life of the compositional shingle while applied to an appropriate roof deck.

Figure 4:
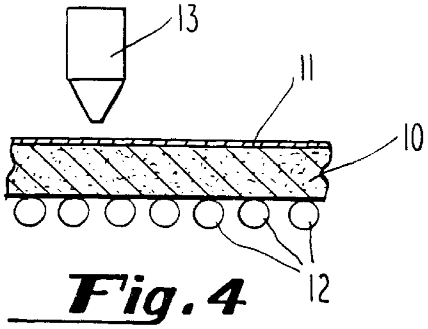
FIG. 4 is a side elevational view of a schematic method of making the shingle of this invention.
Figure 5:
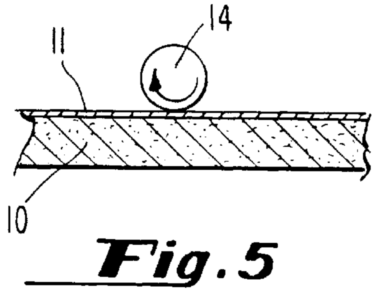
FIG. 5 is a side elevational view of another schematic method of making the shingle of this invention.

In FIG. 4, there is shown schematically a method of marking "release material" to produce the shingle of this invention. The shingle body 10 with affixed release material 11 is progressed during manufacture in the direction of the arrow over rollers 12, while passing near the ink jet printer 13, which is programmed to apply the desired indicia at predetermined intervals. In FIG. 5 there is shown schematically a direct printing method of marking the "release material" , with printing roller 14. As an alternative to the marking methods above-described, preprinted "release material" may be provided at the shingle production facility. Preprinted rolls of material are coordinated according to the indicia thereon so as to be readily unwound and applied to the face of the shingle material so as to identify the compositional shingle with process parameters for the time frame of the manufacture. For instance but not limited to, coded information can identify shingle material down to the specific location; namely hour and specific line and lane of production, since each time a roll of release tape is replaced (typically about an hour) a new coded group of shingles will be formed.

While embossing of release tapes in the shingle production line has been accomplished, difficulties with this process have been found. Embossing wheels are such that changing them over time periods is a cumbersome process. Embossing wheels wear out quickly and get plugged up with shingle material so that the quality of embossed marking is very inconsistent.

We claim:

1. A method of providing identifying indicia as to at least one parameter of manufacture of a composition roofing shingle, comprising the steps of:

a) providing an elongated shingle body of composition roofing, having an exposed face;

b) applying planographic indicia to a separate layer of release material at predetermined intervals;

c) applying the planographic indicia to the shingle's exposed face by affixing the separate layer of elongated release material to the exposed face of the shingle body throughout the extent of the shingle body;

d) whereby the shingle can be identified by the planographic indicia, as to at least one parameter of its manufacture.

2. The method according to claim 1, wherein the indicia indicates the line and lane on which the shingle was manufactured.

3. The method according to claim 1, wherein the indicia comprises bar code.

4. The method according to claim 1, wherein the indicia is applied to the release material after the release material is affixed to the shingle.

5. The method according to claim 1, wherein the indicia is applied to the release material before the release material is affixed to the shingle.

6. The method according to claim 1, wherein the release material remains as a substantially permanent part of the shingle after the shingle is installed and the indicia indicates the location, line and lane at which the shingle was manufactured.

7. The method according to claim 1, wherein the release material remains as a substantially permanent part of the shingle after the shingle is installed.

8. The method according to claim 1, including the step of installing the shingle on a roof while leaving the release material on the shingle as a substantially permanent part of the shingle.

9. The method of claim 1, wherein the step of applying planographic indicia to a separate layer of release material includes applying planographic indicia with identification of process parameters of the time frame of manufacture of the shingle.

10. The method of claim 1, wherein the step of applying planographic indicia to a separate layer of release material includes applying indicia which identifies the location of production of the shingle as a parameter of its manufacture.

11. The process of claim 1, wherein the step of applying the planographic indicia to the shingle by affixing the separate layer of elongated release material to the exposed face of the shingle body is done without marring any exposed face of the shingle as a result of applying the indicia.

* * * * *